(12) United States Patent
Pietri et al.

(10) Patent No.: US 9,951,240 B2
(45) Date of Patent: Apr. 24, 2018

(54) NANOPARTICLE-BASED INK FORMULATIONS

(71) Applicant: GENES'INK SA, Rousset (FR)

(72) Inventors: Emmanuelle Pietri, Peypin (FR); Virginie El Qacemi, Roquevaire (FR); Louis Dominique Kauffman, Hyeres (FR); Corinne Versini, Aix en Provence (FR); Yahia Didane, Toulon (FR)

(73) Assignee: GENES' INK SA, Rousset (FR)

( * ) Notice: Subject to any disclaimer, the term of this patent is extended or adjusted under 35 U.S.C. 154(b) by 87 days.

(21) Appl. No.: 14/902,281

(22) PCT Filed: Jun. 26, 2014

(86) PCT No.: PCT/EP2014/063592
§ 371 (c)(1),
(2) Date: Dec. 30, 2015

(87) PCT Pub. No.: WO2015/000796
PCT Pub. Date: Jan. 8, 2015

(65) Prior Publication Data
US 2016/0185991 A1    Jun. 30, 2016

(30) Foreign Application Priority Data

Jul. 3, 2013 (FR) ...................... 13 01570

(51) Int. Cl.
| *C09D 11/52*  | (2014.01) |
| *C09D 11/033* | (2014.01) |
| *C09D 11/322* | (2014.01) |
| *C09D 11/037* | (2014.01) |

(52) U.S. Cl.
CPC ............ *C09D 11/52* (2013.01); *C09D 11/033* (2013.01); *C09D 11/037* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 2007/0140951 A1* | 6/2007 | O'Brien | A61K 8/19 423/592.1 |
| 2007/0144305 A1  | 6/2007 | Jablonski | |
| 2008/0296567 A1* | 12/2008 | Irving | H01L 21/02554 257/43 |
| 2009/0176013 A1* | 7/2009 | Park | C09D 7/1225 427/126.1 |
| 2011/0303885 A1* | 12/2011 | Vanheusden | H01B 1/22 252/513 |
| 2012/0111409 A1  | 5/2012 | Kim et al. | |
| 2014/0008586 A1  | 1/2014 | Paik et al. | |

FOREIGN PATENT DOCUMENTS

| CN | 102602983       | 7/2012 |
| CN | 103013229 A     | 4/2013 |
| WO | 2009017648      | 2/2009 |
| WO | 2010056826      | 5/2010 |
| WO | 2012115475 A2   | 8/2012 |

* cited by examiner

*Primary Examiner* — Katie L Hammer
(74) *Attorney, Agent, or Firm* — Gable Gotwals

(57) ABSTRACT

The invention relates to nanoparticle-based ink compositions. In particular, this invention relates to semi-conductive nanoparticle-based ink compositions suitable for different printing methods.

16 Claims, 3 Drawing Sheets

NANOPARTICLE-BASED INK FORMULATIONS

CROSS-REFERENCED TO RELATED APPLICATIONS

This application is the United States National Phase of PCT Application No. PCT/EP2014/063592 field 26 Jun. 2014, which claims priority to French Patent Application No. 1301570 filed 3 Jun. 2013, each of which is incorporated herein by reference.

The present invention relates to ink formulations based on (semi)conducting nanoparticles. In particular, the present invention relates to ink compositions based on (semi)conducting nanoparticles suitable for different printing methods.

More particularly, the present invention relates to the field of inks based on (semi)conducting nanoparticles suitable for numerous printing methods. As nonlimiting examples, the following printing methods are mentioned: inkjet, spray, screen printing, rotogravure, flexography, doctor blade, spin coating, and slot die coating.

The inks based on (semi)conducting nanoparticles according to the present invention can be printed on all types of supports. The following supports are mentioned as examples: polymers and polymer derivatives, composite materials, organic materials, inorganic materials. In particular, the supports used in the field of printed electronic, for example, PET, PEN, polyimide, glass, PET/ITO, glass/ITO, polycarbonates, PVC as well as all types of active layers used in optoelectronic devices.

The inks based on (semi)conducting nanoparticles according to present invention have numerous advantages among which we mention as nonlimiting examples:
- greater stability over time compared to the current inks; for example, their stability during storage at ambient temperature is much greater than 6 months;
- versatility with regard to their field of application; as preferred examples we mention optoelectronics, photovoltaics and security;
- nontoxicity of the solvents and of the nanoparticles;
- preservation of the intrinsic properties of the nanoparticles; and, in particular,
- preservation of the electronic properties:

The ZnO-based ink according to the present invention, once deposited, is characterized by its work function or WF. The work function is the energy required for an electron to move from the fermi level to the vacuum level.

The work function obtained according to the present invention is stable and constant with temperature and regardless of what support the ink is deposited on. The mean measured value is preferably on the order of 3.9+/−0.5 eV, which is compatible, among other uses, with the electron injection layer use in optoelectronic and photovoltaic devices. Its use as an electron injection layer in an organic photovoltaic cell allows a substantial improvement of the yield in comparison to the use of LiF deposited by CVD.
- preservation of the properties of fluorescence.

The present invention also relates to an improved method for preparing said inks; finally, the present invention also relates to the use of said inks in the so-called "security" fields, the fields of photovoltaics, sensors (for example, gas sensors), touch panels, biosensors, and contactless technologies.

In view of the literature of recent years, semiconducting colloidal nanocrystals have received much attention due to their novel optoelectronic, photovoltaic and catalytic properties. This makes them particularly advantageous for future applications in the field of nanoelectronics, solar cells, sensors, and in the biomedical field.

The development of semiconducting nanoparticles makes it possible to use novel implementations and to foresee a multitude of new applications. The nanoparticles have a very high surface/volume ratio and the substitution of their surface with surfactants leads to change in certain properties, in particular optical properties, and the possibility of dispersing them.

Their small dimensions can, in some cases, produce quantum confinement effects. The nanoparticles can be beads (from 1 to 100 nm), small rods (L<200 to 300 nm), threads (few hundred nanometers or a few microns), disks, stars, pyramids, tetrapodes or crystals when they have no predefined form.

Several processes have been developed for the purpose of synthesizing semiconducting nanoparticles. Among them, one can mention in a noncomprehensive list:
physical processes:
  chemical vapor deposition (also known by the name "CVD") when a substrate is exposed to volatilized chemical precursors that react or decompose on its surface. This process generally leads to the formation of nanoparticles whose morphology depends on the conditions used;
  thermal evaporation;
  molecular beam epitaxy, when atoms that will form the nanoparticles are bombarded at high speed onto the substrate (where they become attached) in the form of a gas flow;
physicochemical processes
  microemulsion;
  laser pulse in solution, when a solution containing a precursor is irradiated with a laser beam. The nanoparticles are formed in the solution along the light beam;
  Synthesis by irradiation with microwaves;
  Oriented synthesis assisted by surfactants;
  Synthesis under ultrasound;
  Electrochemical synthesis;
  Organometallic synthesis;
  Synthesis in an alcohol medium.

The physical syntheses generally require high temperatures, which makes them poorly suited for switching to production on the industrial scale. In addition, this makes them unsuitable for certain substrates, for example, flexible substrates.

As for chemical syntheses, they have a major advantage for the production of nanoparticles: the semiconducting nanoparticles are dispersed in solvents and, in most cases, not attached to the substrate. Finally, they make it possible to control the shape of the nanoparticles.

The aim of the present invention is to overcome one or more disadvantages of the prior art by providing a stable, versatile and improved ink, which makes it possible to preserve the intrinsic characteristics of the nanoparticles, in particular their fluorescence property and their electronic properties.

DETAILED DESCRIPTION OF THE DRAWINGS

Figure 1:
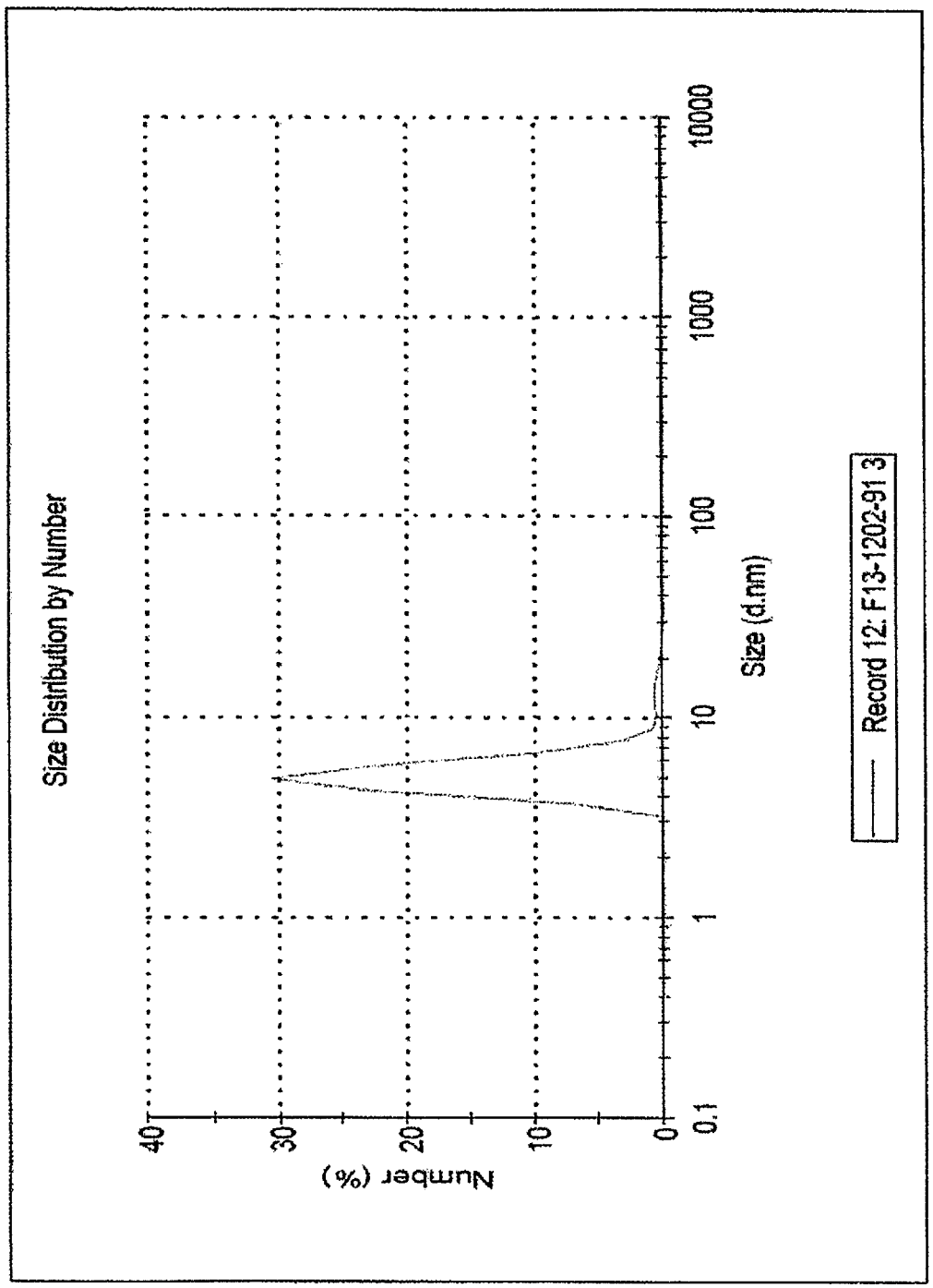
FIG. 1 illustrates samples of particle size distribution of the ink composition of the invention.

According to an embodiment of the present invention, this aim is achieved by means of an ink whose composition includes at least:

a. a compound "a" consisting of nanoparticles,
   b. a compound "b" consisting of an alcohol solvent,
   c. a compound "c" consisting of an alcohol cosolvent different from compound "b,"
   d. a compound "d" consisting of a dispersant, and
   e. an optional compound "e" consisting of a thickener or stabilizer.

The viscosity of the ink according to the present invention is preferably between 1 and 500 mPa·s; the viscosity of the ink according to the present invention is preferably between 1 and 50 mPa·s, for example, between 8 and 40 mPa·s; these two last viscosity ranges are preferred in the absence of compound "e." This viscosity can be advantageously measured using the following method:

Apparatus: Rheometer AR-G2 from TA Instrument
   Conditioning time: 1 min
   Test type: Continuous ramp
   Ramp: Shear rate (1/s)
   From: 0.001 to 40 (1/s)
   Duration: 10 min
   Mode: linear
   Measurement: every 10 seconds
   Temperature: 20° C.
   Curve reprocessing method: Newton's method
   Reprocessed area: the entire curve Compound "a" according to the present invention thus consists of nanoparticles. According to an embodiment variant of the present invention, the objectives of the present invention are reached particularly satisfactorily when the compound "a" consists of metal oxide nanoparticles, more particularly zinc oxide nanoparticles.

According to an embodiment variant of the present invention, the nanoparticles have sizes between 1 and 50 nm, preferably between 2 and 20 nm. According to an embodiment variant of the present invention, the nanoparticles are of spheroidal and/or spherical shape. For the present invention and the claims that follow, the term "of spheroidal shape" means that the shape resembles that of a sphere but is not perfectly round ("quasi-spherical"), for example, an ellipsoid shape. The shape of the nanoparticles is generally identified by means of photographs taken with a microscope. Thus, according to this embodiment variant of the present invention, the nanoparticles have diameters between 1 and 50 nm, preferably between 2 and 20 nm.

According to a particular embodiment of the present invention, the metal oxide nanoparticles have been synthesized beforehand by chemical synthesis. Any chemical synthesis can be used preferably in the context of the present invention. For example, a chemical synthesis is mentioned that uses zinc acetate [Zn(CH3COO)2] as precursor. In general, the precursor is dissolved in methanol; after heating this solution, one adds a solution of potassium hydroxide (KOH) and/or of sodium hydroxide (NaOH) to it, which makes it possible to obtain the desired nanoparticles. In general, the nanoparticles are then subjected to washing which makes it possible to eliminate anything that is not chemically or physically bound to the nanoparticles.

However, the applicant discovered unexpectedly that the ink compositions including nanoparticles synthesized from the zinc acetate precursor have improved properties. Although the applicant does not wish to be limited to this explanation, the applicant thinks that this improvement could originate from the presence of acetate ligands which originate from the precursor and remain bound to the nanoparticles.

According to a particular embodiment of the invention, the nanoparticles synthesized by chemical synthesis according to the present invention contain 5% to 15% by weight of acetate ligands, preferably between 7 and 14%, for example, between 8 and 12% by weight of acetate ligands. This ligand content in the nanoparticle can be measured advantageously according to the following method:

Thermogravimetric Analysis
   Apparatus: TGA Q50 from TA Instrument
   Crucible: Alumina
   Method: ramp
   Measurement range: from ambient temperature to 600° C.
   Temperature rise: 10° C./min A particular example of synthesis of nanoparticles according to the present invention is described as an illustration below: in a vessel, a mixture of potassium hydroxide and methanol is prepared under magnetic stirring until a fine dispersion is obtained. In another vessel, under magnetic stirring and at ambient temperature, zinc acetate is dissolved in a mixture of methanol and water. Then, the potassium hydroxide solution is added dropwise to the zinc acetate solution in an inert atmosphere and at 60° C. under magnetic stirring, which makes it possible (after decanting and washing) to obtain the zinc oxide nanoparticles. This synthesis allows the obtention of zinc oxide nanospheres with a well-controlled particle size distribution; it is thus possible to obtain, depending on the duration of the synthesis steps, spherical nanoparticles having a diameter that can vary from 2 to 10 nm.

Compound "b" according to the invention thus consists of an alcohol solvent. The alcohol is preferably selected from the aliphatic monohydric alcohols or their mixtures; preferably from the primary paraffinic aliphatic monohydric alcohols having fewer than 10 carbon atoms. As an example, ethanol, isopropanol and/or butanol, preferably n-butanol are mentioned.

Compound "c" according to the present invention thus consists of an alcohol solvent different from compound "b."

The alcohol is preferably selected from the unsaturated monohydric alcohols or their mixtures. As an example, the terpenic alcohols, preferably terpineol, preferably alpha-terpineol, are mentioned.

Compound "d" according to the present invention thus consists of a dispersant. Beyond its function as dispersant, which is thus different from the function as solvent of the above-mentioned compounds "b" and "c," compound "d" is different from compounds "b" and "c" used in the composition. This dispersant can be selected advantageously from the family of alcohol amines and of polyalcohols, or their mixture. As examples of alcohol amines, dimethanolamine, diethanolamine, and/or ethanolamine and their mixture, and preferably ethanolamine, are mentioned. Also as examples of polyalcohols, ethylene glycol, diethylene glycol, propylene glycol and/or their mixture, and preferably ethylene glycol, are mentioned.

Compound "e" which is optional according to the present invention thus consists of a thickener or stabilizer. Beyond its function as thickener or stabilizer, which is thus different from the dispersant function of compound "d" and the solvent function of the above-mentioned compounds "b" and "c," compound "e" is different from compounds "b," "c" and "d" used in the composition. As examples, alkylcellulose, preferably ethylcellulose, and the modified ureas, preferably polyureas, and/or their mixtures are mentioned.

According to an embodiment of the present invention, the ink includes
- a compound "a" in a content of between 0.1 and 15% by weight, preferably less than 15% by weight, preferably between 0.5 and 8% by weight, for example, between 0.5 and 2% by weight,
- a compound "b" in a content of between 9 and 99% by weight, preferably between 9 and 50% by weight,
- a compound "c" in a content of between 0.5 and 90% by weight, preferably more than 5% by weight, preferably more than 15% by weight, preferably between 50 and 90% by weight,
- a compound "d" in a content of less than 5% by weight, preferably between 0.05 and 2% by weight, and
- an optional compound "e" in a content of less than 4% by weight, preferably between 0.5 and 2% by weight.

According to an embodiment of the present invention, the ink can also include in its composition other compounds among which we mention as examples solvents (for example, water, alcohols) and/or surfactants, and/or polymers.

However, the compounds "a," "b," "c," and "d" and "e" (in the ranges of proportions indicated above) preferably will constitute at least 50% by weight of the final ink, preferably at least 75% by weight, for example, at least 90% by weight, at least 95% by weight, at least 99% by weight, or even 100% by weight of the final ink.

The present invention also relates to a method for preparing an ink formulation according to the present invention, method which includes the following steps:
a) mixing of the nanoparticles (compound "a") with the solvent (compound "b") under stirring,
b) addition to said mixture from the previous step of the dispersant (compound "d") and of compound "c" and stirring, and
c) optionally, mixing between the mixture obtained in step b) and compound "e" (this mixing being possibly carried out by adding compound "e" to the mixture obtained in step b, or adding the mixture obtained in step b to the compound "e"), and stirring, and
d) obtention of an ink.

An alternative to this method for preparing an ink formulation according to the present invention, when the optional compound "e" is present, includes preferably the following steps:
a) mixing of the nanoparticles (compound "a") with a solvent (compound "b") under stirring,
b) addition to said mixture from the previous step of the dispersant (compound "d") and stirring,
c) mixing of the compounds "c" and "e," and
d) mixing between the mixture obtained in step b) and the mixture obtained in step c) (this mixing being possibly carried out by adding the mixture obtained in step c) to the mixture in step b, or adding the mixture obtained in step b to the mixture obtained in step c)), and stirring, and
d) obtention of an ink.

The ink so obtained can be used directly or it can be diluted to obtain the desired properties.

An additional advantage of the ink according to the present invention lies in the fact that its preparation can be carried out at conditions of pressure and/or temperature that are not restrictive, for example, at pressure and/or temperature conditions close to or identical to the normal or ambient conditions. It is preferable to stick to values that are at least 40% of the values of the normal or ambient pressure and/or temperature conditions. For example, the applicant has observed that it is preferable to maintain the pressure and/or temperature conditions during the preparation of the ink at values varying at most by 30%, preferably by 15% around the values of the normal or ambient conditions. A control of these pressure and/or temperature conditions can thus be included advantageously in the device for preparing the ink so as to satisfy these conditions.

This advantage connected with the preparation of the ink under nonrestrictive conditions is quite clearly also reflected in a facilitated use of said inks. According to a preferred embodiment of the invention, the ink can be used advantageously in any printing method, in particular in the following printing methods: inkjet, spray, screen printing, rotogravure, flexography, doctor blade, spin coating, and slot die coating.

The present invention thus also relates to a use of said inks in the so-called "security" fields, the fields of photovoltaics, sensors (for example, gas sensors), touch panels, biosensors, and contactless technologies.

Thus, it is obvious to the person skilled in the art that the present invention allows embodiments in numerous other specific forms without diverging from the field of application of the invention as claimed. Consequently, the present embodiments must be considered illustrative, but they can be modified in the range defined by the scope of the attached claims.

The table below lists two ink compositions according to the present invention. The types of compounds "a," "b," "c" and "d" are indicated in the table as well as their concentration by weight for each one of the compositions. The zinc oxide nanoparticles used for the two compositions are identical and were obtained using the particular synthesis example described in the text above. Said zinc oxide nanoparticles are characterized by a spherical morphology and by a residual acetate ligand content of 9.5% by weight. For the present invention and the claims that follow, the percent by weight of compound "a" is calculated on the basis of the weight of the nanoparticles with their ligands.

One can also see the value of the viscosity property of the inks in the last line of the table. These values were measured in accordance with the method described above in the description.

Studies of the particle size distribution were also carried out for these two compositions of ink compositions (ZnO5F24 and ZnO5F33).

Figure 2:
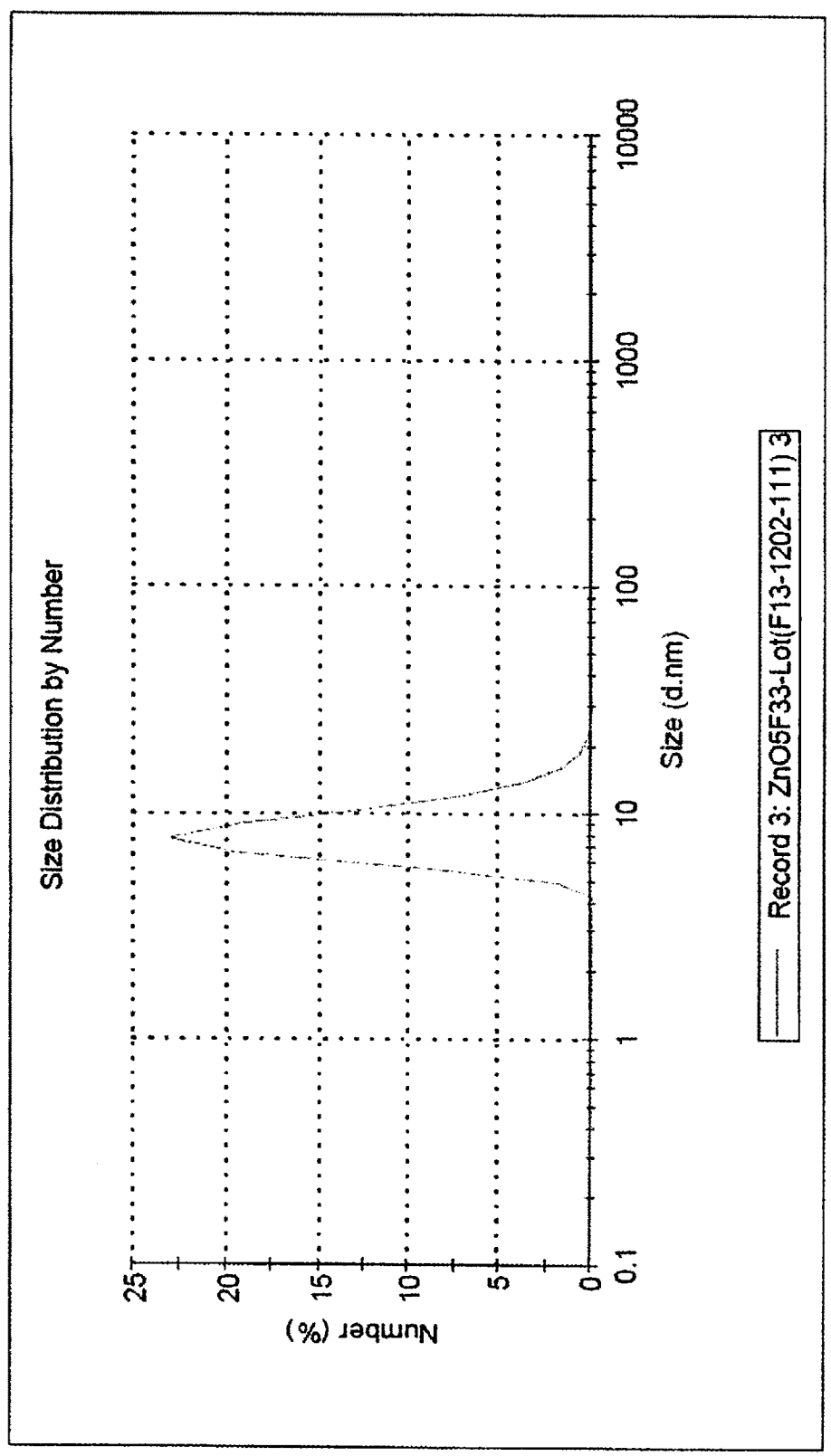
FIG. 2 illustrates samples of particle size distribution of the ink composition of the invention.

The corresponding curves are illustrated in FIGS. 1 and 2.

These measurements were carried out using a Nanosizer S apparatus from Malvern according to the following characteristics:

Hydrodynamic diameter: approximately 10 nm

Measurement method DLS:

Type of cuvette: optical glass

Material: ZnO

Temperature: 20.0° C.

Viscosity: 28 cP for the ink ZnO5F24 and 10.5 cP for the ink ZnO5F33 (by default, the viscosity is adjusted as a function of the measured real viscosity)

Refractive index: 1.464, for the ink ZnO5F24 and 1.434 for the ink ZnO5F33.

The D50 values of the inks are 5 nm for the ink ZnO5F24 and 9 nm for the ink ZnO5F33, respectively. According to an embodiment variant of the present invention, the inks have a D50 of less than 20 nm and/or preferably greater than 3 nm.

|  | ZnO5F24 | ZnO5F33 |
|---|---|---|
| Compound "a" ZnO | 1.00% | 1.00% |
| solvent "c" alcohol 1 α-terpineol | 88.40% | 59.00% |
| solvent "b" alcohol 2 1-butanol | 10.50% | 39.90% |
| dispersant "d" diethanolamine | 0.10% |  |
| dispersant "d" ethanolamine |  | 0.10% |
| TOTAL | 100.00% | 100.00% |
| property A Viscosity | 30 mPa·s | 10.5 mPa·s |

Figure 3:
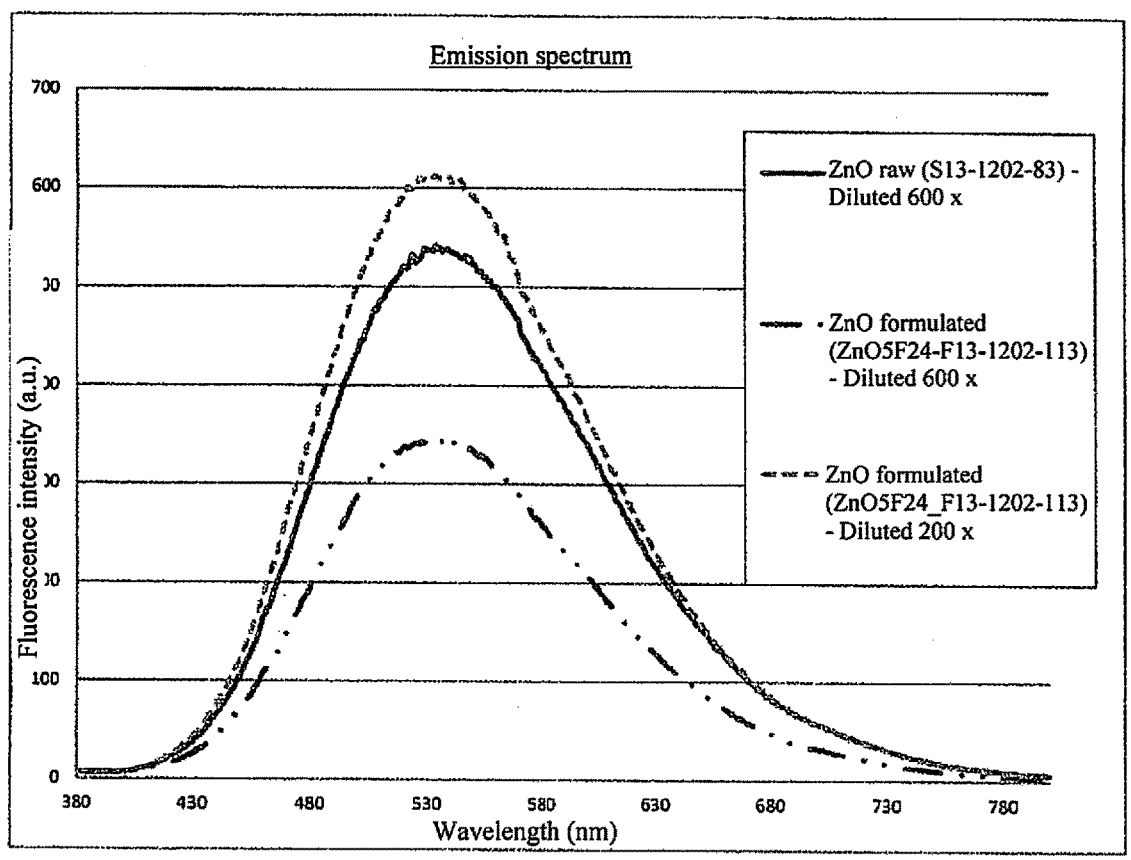
FIG. 3 illustrates property measurements of the ink composition of the invention.

Finally, a comparison of the fluorescence property measurement was carried out on the zinc oxide nanoparticles and on the ink composition corresponding to the first ink formulation of the table (ZNO5F24), respectively. This measurement was carried out using a Clarian Cary Eclipse spectrophotometer under the conditions indicated below:

Fluorescence Method
Apparatus: Cary Eclipse from Clarian
Mode: Emission
Excitation wavelength: 330 nm
Start: 380 nm
Stop: 880 nm
Excitation slit: 5
Emission slit: 5
Filter: Auto The corresponding measurements are indicated in FIG. 3 below. Therein, one can see fluorescence property preservation for the inks according to the present invention, which makes them particularly advantageous for the so-called "security" fields.

The invention claimed is:

1. An ink composition comprising:
   a. a compound "a" consisting of zinc oxide nanoparticles synthesized by chemical synthesis using zinc acetate as a precursor and containing 5% to 15% by weight of acetate ligands, said acetate ligands originating from the zinc acetate precursor and remaining bound to the zinc oxide nanoparticles,
   b. a compound "b" consisting of an alcohol solvent selected from the aliphatic monohydric alcohols or their mixtures,
   c. a compound "c" consisting of an alcohol cosolvent different from compound "b" and selected from the unsaturated monohydric alcohols or their mixtures,
   d. a compound "d" consisting of a dispersant, and
   e. an optional compound "e" consisting of a thickener or stabilizer.

2. The ink composition according to claim 1, wherein when measuring at 20° C. using a rheometer the composition has a viscosity between 1 and 500 mPa·s.

3. The ink composition according to claim 1, wherein when measuring at 20° C. using a rheometer the composition has a viscosity between 1 and 50 mPa·s.

4. The ink composition according to claim 1, wherein the nanoparticles are conductive and/or semiconductive.

5. The ink composition according to claim 1, wherein the compound "b" is a primary paraffinic aliphatic monohydric alcohol having fewer than 10 carbon atoms selected from the group consisting of ethanol, isopropanol, butanol and/or butanol.

6. The ink composition according to claim 1, wherein the compound "c" is a terpenic alcohol selected from the group consisting of terpineol and alpha-terpineol.

7. The ink composition according to claim 1, wherein the compound "d" is selected from the group consisting of dimethanolamine, diethanolamine, ethanolamine, ethylene glycol, diethylene glycol, propylene glycol or a mixture thereof.

8. The ink composition according to claim 1, wherein the compound "e" is present and is selected from the group consisting of ethylcellulose, modified ureas, polyureas, or a mixture thereof.

9. The ink composition according to claim 1, including
   a compound "a" in a content of between 0.1 and 15% by weight,
   a compound "b" in a content of between 9 and 99% by weight,
   a compound "c" in a content of between 0.5 and 90% by weight,
   a compound "d" in a content of less than 5% by weight, and
   an optional compound "e" in a content of less than 4% by weight.

10. The ink composition according to claim 8, including
    a compound "a" in a content of less than 15% by weight,
    a compound "b" in a content of between 9 and 50% by weight,
    a compound "c" in a content of more than 5% by weight,
    a compound "d" in a content of less than 5% by weight, and
    an optional compound "e" in a content of less than 4% by weight.

11. The ink composition according to claim 1, wherein when measuring at 20° C. using a rheometer the composition has a viscosity between 8 and 40 mPa·s.

12. The ink composition according to claim 1, wherein compound "a" contains between 7 and 14% by weight of acetate ligands.

13. The ink composition according to claim 1, wherein compound "a" contains between 8 and 12% by weight of acetate ligands.

14. The ink composition according to claim 1, including,
    the compound "a" in a content of between 0.5 and 8% by weight,
    the compound "b" in a content of between 9 and 50% by weight,
    the compound "c" in a content of between 50 and 90% by weight,
    the compound "d" in a content between 0.05 and 2% by weight, and
    an optional compound "e" in a content between 0.5 and 2% by weight.

15. The ink composition according to claim 8, including
    the compound "a" in a content of between 0.5 and 8% by weight,
    the compound "b" in a content of between 9 and 50% by weight,
    the compound "c" in a content of more than 15% by weight,
    the compound "d" in a content of between 0.05 and 2% by weight, and
    an optional compound "e" in a content of between 0.5 and 2% by weight.

16. The ink composition according to claim 8, including
    the compound "a" in a content of between 0.5 and 2% by weight, the compound "b" in a content of between 9 and 50% by weight, the compound "c" in a content of between 50 and 90% by weight, the compound "d" in a content of between 0.05 and 2% by weight, and an optional compound "e" in a content of between 0.5 and 2% by weight.

* * * * *